Reissued Aug. 1, 1944

Re. 22,524

UNITED STATES PATENT OFFICE 22,524

INSECTICIDE

Seaver A. Ballard, Oakland, and Vernon E. Haury, El Cerrito, Calif., assignors to Shell Development Company, San Francisco, Calif., a corporation of Delaware No Drawing. Original No. 2,307,482, dated January 5, 1943, Serial No. 381,548, March 3, 1941. Application for reissue July 28, 1943, Serial No. 496,680

17 Claims. (Cl. 167—24)

This invention deals with a new insecticidal composition of great utility and is particularly concerned with toxic substances suitable for use in household insecticides.

It is the object of the present invention to provide an insecticide which can readily be manufactured from readily available, inexpensive domestic materials. It is a further object of this invention to provide a very toxic moderately fast-acting insecticide which is little, if any, toxic to man and other warm blooded animals. Other objects will be apparent on reading the specification.

It has now been found that the alicarbocyclic unsaturated ketols having the carbonyl group in the ring and having from 10 to 24 or even higher carbon atoms make excellent insecticides. Those unsaturated ketols having at least 15 carbon atoms are preferred, it having been found that the higher members of the series have a more pronounced insecticidal activity.

The preferred ketols are produced by the aldol condensation of lower cyclic ketones such as cyclohexanone, cyclohexenone, cyclopentenone, cyclopentanone, isophorone and the like. In general, the ketones suitable for use have from about 5 to 12 carbon atoms. In the condensation reaction dimers, trimers and higher homologues are produced so that the starting materials may consist of even lower ketones such as acetone and mesityl oxide which condense to form ring structures and which further condense to form ketols suitable for the purposes of the present invention. However, to avoid complicating factors such as side reactions it is generally best to start with a material having from 5 to 12 carbon atoms and to not condense further than the dimer or trimer, ordinarily such ketols are free from carboxyl groups and/or ester linkages.

Cyclic ketols suitable for the present invention cannot ordinarily be produced by the use of all the normal aldol condensation catalysts. Only those caustic alkali catalysts which are more basic than lime have been found suitable, e. g. the alkali metal hydroxide such as sodium and potassium hydroxide, sodamide, or sodium ethylate, or other alkali metal alkylates.

The ketols produced by condensing lower ketones ordinarily consist of a mixture of dimers, trimers and other polymers having one or two rings and ordinarily at least one of the rings is unsaturated. The mixture of ketols so produced can be used as it is or can be fractionated to separate fractions having different boiling ranges. For instance, the higher members of the series are the most toxic and therefore are very suitable for agricultural use, while the lower boiling members are more suitable for use where volatility is of importance. The well-known methods of fractionation such as ordinary distillation, vacuum distillation, extractive distillation or azeotropical distillation may be used.

One suitable ketol was made by condensing isophorone to diisophorone by means of sodium hydroxide. A vessel equipped with heating and stirring means was charged with four parts by weight of isophorone and one part of 60% sodium hydroxide solution. The mixture was heated to about 150° C. with stirring and was maintained at this temperature for 1½ hours. On cooling, two phases were formed, an upper phase of ketols and unreacted ketones and a lower phase of aqueous sodium hydroxide. The phases were separated and the upper phase was washed with water to remove entrained sodium hydroxide solution. The organic material now consists of a mixture of unreacted isophorone and its condensed dimer and perhaps some trimer. The unreacted material was first removed overhead by distillation under a vacuum of about 2 mm. and then the diisophorone was taken off overhead which solidifies to a colorless crystalline solid which melts at from 83.5° C. to 84.5° C. and which is color stable except in the presence of direct sunlight.

Modified Peet Grady tests were made of the ketol thus obtained. The general test is fully described in the 1940 "Blue Book" published by the publisher of "Soap and Sanitary Chemicals" periodical on pages 193 to 197, as the large group method. Briefly the test as practiced consists of releasing 100 to 150 flies in an air-conditioned cage 6 x 6 x 6 feet and spraying them with 6 ml. of insecticide. After 10 minutes exposure the number of flies which are incapacitated or "knocked down" is noted and all flies are transferred to a cage and allowed to recuperate in fresh air for 24 hours, when the dead flies are counted. For the purposes of this study the official Peet Grady procedure was not followed in calculating the results, but only the percentages knocked down at 10 minutes and killed at 24 hours were recorded. For purposes of comparison, a spray was included in the test composed of 7.3% pyrethrum extract and 92.7 of odorless base (kerosene) and which had a rating of AA according to the standards of the National Association of Insecticide and Disinfectant Mfgrs.

Hereafter this spray is referred to as the "standard sample." This standard sample was given a rating of 100% both on the 10 minute knockdown and 24 hour kill. Actually the knockdown is about 95% and the kill is about 35%. The effectiveness of the other insecticides is then calculated on the basis of their effectiveness as compared with the standard sample. The following results were obtained by testing pyrethrum and diisophorone sprays in the above manner:

| | Knockdown [1] | 24 hour kill [1] |
|---|---|---|
| | *Percent* | *Percent* |
| 7.3% by vol. pyrethrum extract (20:1 concentrate), 92.7% by vol. odorless base | 100 | 100 |
| 9% by wt. diisophorone, 91% by wt. odorless base | 87 | 139 |
| 3.6% by wt. diisophorone. 94.4% by wt. odorless base containing 2.1% by volume pyrethrum extract | 97 | 132 |

[1] In percent of standard sample.

From the above data it can be seen that the ketol has an extremely high killing power and a reasonably good knockdown. It is also apparent that the ketol besides being useful in itself as an insecticide is a valuable adjunct to known insecticides such as pyrethrum. The ketols may also be used in combination with other insecticides or fungicides such as lead arsenate, rotenone, nicotine, thiocyanates, isothiocyanates, copper naphthenate and the like.

The example of making and testing diisophorone was meant to be purely illustrative, it being understood that this invention is not limited to the method of manufacture of the ketol.

The unsaturated ketols may be applied to plants and animals in a variety of ways. For use as household insecticides the ketols may be dissolved in a light hydrocarbon oil such as kerosene or kerosene distillate with or without the addition of other insecticides and sprayed. Ordinarily from about 1% to 25% of the unsaturated ketols are used in such sprays. For use on plants, the ketones may be dissolved in plant spray oils and emulsified in water to produce sprayable emulsions. The common emulsifying agents such as glycerol mono-oleate, amine salts, sulfated and sulfonated fatty and mineral oils, soaps, and the like may be used in combination with such sprays. In the same manner, the ketols themselves without the addition of oil, may be emulsified and used as plant spray insecticides. The ketols may also be adsorbed by finely divided solid materials such as wood flour, talc, clay, sulfur, or carbon black, and used as dusting insecticides. For this purpose the heavier solid ketols such as the diisophorone described above are preferred.

When solutions of the ketol in odorless base are placed on filter paper and exposed to air, the liquid evaporates leaving substantially no stain behind. Thus the ketols are suitable for use as household insecticides and the like where staining is highly undesirable.

We claim as our invention:

1. The process of controlling insect pests, comprising the step of exposing said pests to an unsaturated alicarbocyclic ketol having the carbonyl group in the ring and containing at least 10 carbon atoms.

2. An insecticidal composition comprising a carrier and an unsaturated alicarbocyclic ketol having the carbonyl group in the ring and containing at least 10 carbon atoms.

3. An insecticidal composition comprising a carrier and an unsaturated alicarbocyclic ketol having the carbonyl group in the ring and containing from 10 to 24 carbon atoms.

4. An insecticidal composition comprising a carrier and an unsaturated alicarbocyclic ketol having the carbonyl group in the ring and containing at least 15 carbon atoms.

5. An insecticidal composition comprising a carrier and an unsaturated ketol having at least 2 alicarbocyclic rings, at least one of them containing the carbonyl group as part of the ring.

6. An insecticidal composition comprising a carrier and an unsaturated alicarbocyclic ketol having at least 10 carbon atoms and produced by condensing with each other carbocyclic ketones having the carbonyl group in the ring.

7. An insecticidal composition comprising a carrier and diisophorone.

8. An insecticide comprising an alicarbocyclic unsaturated ketol having at least 10 carbon atoms whose carbonyl group is part of the ring and an additional insecticide selected from the group consisting of pyrethrum and derris.

9. An insecticide comprising an alicarbocyclic unsaturated ketol having at least 10 carbon atoms whose carbonyl group is part of the ring and pyrethrum.

10. An insecticide comprising diisophorone and pyrethrum.

11. An insecticidal spray composition, comprising a mineral oil and an unsaturated alicarbocyclic ketol having the carbonyl group in the ring and containing at least 10 carbon atoms.

12. An insecticidal spray composition, comprising a mineral oil and diisophorone.

13. An insecticidal spray composition, comprising a mineral oil, an emulsifying agent, water, and an alicarbocyclic unsaturated ketol having the carbonyl group in the ring and containing at least 10 carbon atoms.

14. A plant spray insecticide comprising a plant spray mineral oil, an emulsifying agent and an alicarbocyclic unsaturated ketol having the carbonyl group in the ring and containing at least 10 carbon atoms.

15. An aqueous insecticidal emulsion, comprising water and an unsaturated alicarbocyclic ketol having the carbonyl group in the ring and containing at least 10 carbon atoms.

16. A dust insecticide composition, comprising a finely divided adsorptive substance and an unsaturated alicarbocyclic ketol having the carbonyl group in the ring and containing at least 10 carbon atoms.

17. A household insecticide comprising a light hydrocarbon oil and an alicarbocyclic unsaturated ketol having the carbonyl group in the ring and containing at least 10 carbon atoms.

SEAVER A. BALLARD.
VERNON E. HAURY.